United States Patent [19]

Andrews

[11] Patent Number: 5,762,146
[45] Date of Patent: Jun. 9, 1998

[54] NURSERY PLANT DIGGER

[76] Inventor: Ralph W. Andrews, 101 Rainbow Dr. Apt. 7901, Livingston, Tex. 77351-9330

[21] Appl. No.: 782,191

[22] Filed: Jan. 10, 1997

[51] Int. Cl.$^6$ ............................................. A01G 23/02
[52] U.S. Cl. ..................... 171/71; 171/132; 111/101; 37/302
[58] Field of Search ..................... 171/71, 111, 132, 171/78, 62, 50, 126; 172/439; 111/101; 37/302, 301

[56] References Cited

U.S. PATENT DOCUMENTS

| | | | |
|---|---|---|---|
| 537,953 | 4/1895 | Wood | 171/71 |
| 568,449 | 9/1896 | Lemay | 171/71 X |
| 1,443,222 | 1/1923 | Johnson | 171/71 |
| 3,340,934 | 9/1967 | Wycoff | 171/71 X |
| 3,512,276 | 5/1970 | Juhl | 111/101 |
| 3,775,876 | 12/1973 | May | 111/101 |
| 3,889,402 | 6/1975 | Wheeler et al. | 111/101 |
| 4,271,611 | 6/1981 | Paul . | |
| 4,305,213 | 12/1981 | Pelham . | |
| 4,332,093 | 6/1982 | Berthollet . | |
| 4,402,148 | 9/1983 | Schiffelbein . | |
| 4,494,325 | 1/1985 | Berthollet . | |
| 5,601,146 | 2/1997 | Schlegel et al. | 172/439 |

*Primary Examiner*—Terry Lee Melius
*Assistant Examiner*—Christopher J. Novosad
*Attorney, Agent, or Firm*—Dean A. Craine

[57] ABSTRACT

A nursery plant digger apparatus designed to be pulled behind a typical tractor and used to harvest bare root plants grown in long, parallel rows in a field. The digger apparatus includes a horizontally aligned tool bar attached to the rear of the tractor. Extended laterally from one side of the tool bar is an adjustable, U-shaped scoop which is dragged in the soil as the tractor is driven in a forward direction on the field. The angle and position of the scoop relative to the tool bar may be adjusted to control the digging depth of the scoop. During normal use, the scoop is adjusted to travel under the plant's deepest root. A shaking grate is pivotally attached to the rear edge of the scoop. During use, a hydraulic motor is connected to an eccentric which causes the grate to shake downward to dislodge soil delivered to the grate as the tractor moves in a forward direction.

5 Claims, 5 Drawing Sheets

NURSERY PLANT DIGGER

BACKGROUND OF THE INVENTION

1. Field of the Invention

This invention relates to nursery plant diggers and, more specifically, to nursery plant diggers designed to remove plants from the soil and produce bare root plants for easy transport and replanting.

2. Description of the Related Art

Large nursery plant growers often grow seedlings in long, parallel rows in large fields. When the plants grow to a desired height, they must be harvested and transported to a nursery for direct sale to the public or to an intermediate wholesaler or to a nursery for resale. Depending upon the type, some plants are harvested with bare roots while others are harvested with a root ball.

When harvesting bare root plants, each plant must be gently removed from the soil and then shaken to remove the soil from its roots without damaging the plant. The plants are then bundled together and transported to a desired resale location.

Typically, nurseries use the bucket on a standard tractor, a large nursery tree remover apparatus (see U.S. Pat. No. 4,305,213) or a c-shaped ring mounted apparatus pulled by a tractor (see U.S. Pat. No. 4,332,093) to harvest plants. Unfortunately, none of these apparatus by themselves produce root bare plants. In order to do so with these apparatus, the plants must be manually shaken to remove the soil from the roots. Needless to say, this additional act adds to the expense of harvesting the plants.

What is needed is an apparatus that can be easily attached to existing machinery used by a nursery grower that can be used to harvest plants grown in long parallel rows, which also removes the soil from the roots, and then deposits the plants in an orderly manner so they can be easily bundled together for delivery.

SUMMARY OF THE INVENTION

It is an object of the invention to provide an apparatus for gently harvesting plants grown in long, parallel rows in a field.

It is another object of the invention to provide such as apparatus that removes the soil from the roots of plant.

It is further object of the invention to provide such an apparatus that deposits the root bare plants in an orderly manner for bundling them together.

It is a still further object of the invention to provide such an apparatus that can be easily attached a to standard tractor used by a nursery grower and is economical to manufacture.

These and other objects are met by providing a digger apparatus capable of being pulled by a typical tractor and used to harvest bare root plants grown in long, parallel rows in a field. The digger apparatus includes a horizontally aligned tool bar attached to the rear of the tractor via a three point hitch assembly. Attached to the distal extending end of the tool bar is a U-shaped scoop which is pulled through the soil as the tractor is driven in a forward direction in the field. The angle and position of the tool bar can be adjusted via a height adjustment means disposed between the tractor and tool bar so that the leading edge of the scoop travels through the soil slightly under the plant thereby lifting the plant from the soil as the tractor moves in a forward direction over the soil.

As the tractor continues to move in a forward direction, plants deposited into the scoop are forced out of the scoop and onto a shaking grate. The shaking grate is pivotally attached along its front edge to the rear edge of the scoop. During use, a shaking great means is connected between the shaking and the tool bar which causes the shaking grate to move up and downward to dislodge the soil from the roots of plants deposited on the shaking grate. In the embodiment described herein, the shaking means includes a hydraulic motor with an eccentric connected to its drive shaft. The eccentric is pivotally connected to the upper end of a rocker arm which is pivotally connected at its lower end to the shaking grate. When the motor is activated, the eccentric causes the rocker arm to move up and down thereby gently shaking any loose soil that clings to the plant's root ball. An adjustment means is also provided which enables the angle of the shaking grate relative to the scoop to be adjusted according to the hardness of the soil, the amount of rocks therein, and the plant's size and variety. As the tractor continues to move in a forward direction parallel to the row of plants, the harvested plants with their root balls soil free, exit the shaking grate and are deposited in an orderly manner for easy pickup.

DESCRIPTION OF THE PREFERRED EMBODIMENT(S)

Figure 1:
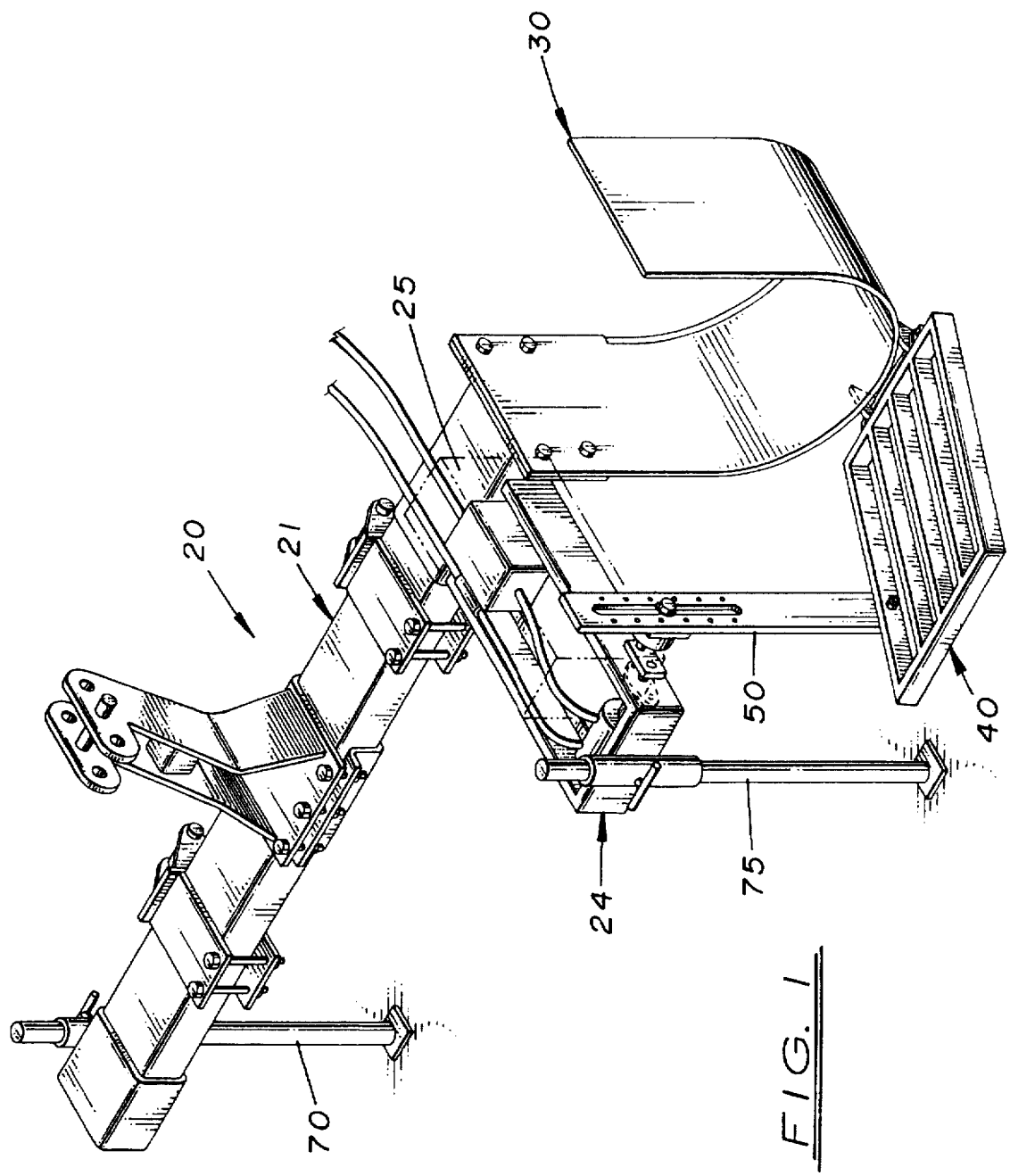
FIG. 1 is a perspective view of the invention disclosed herein.

Shown in the accompanying FIGS. 1–5, there is shown a digger apparatus, generally referred to as 20, designed to harvest bare root plants 92 grown 92 in long, parallel rows 90 in a field. The digger apparatus 20 is designed to be pulled behind a typical tractor 8 having a three point hitch system 9 as shown in FIG. 1. The three point hitch system 9 includes a centrally located upper link connector 11 and two lower, side link connectors 13, 14. The height and angle of the three point hitch system 9 is hydraulically controlled by the tractor's hydraulic system via the upper and lower links 11, 13, and 14, respectively.

Figure 3:
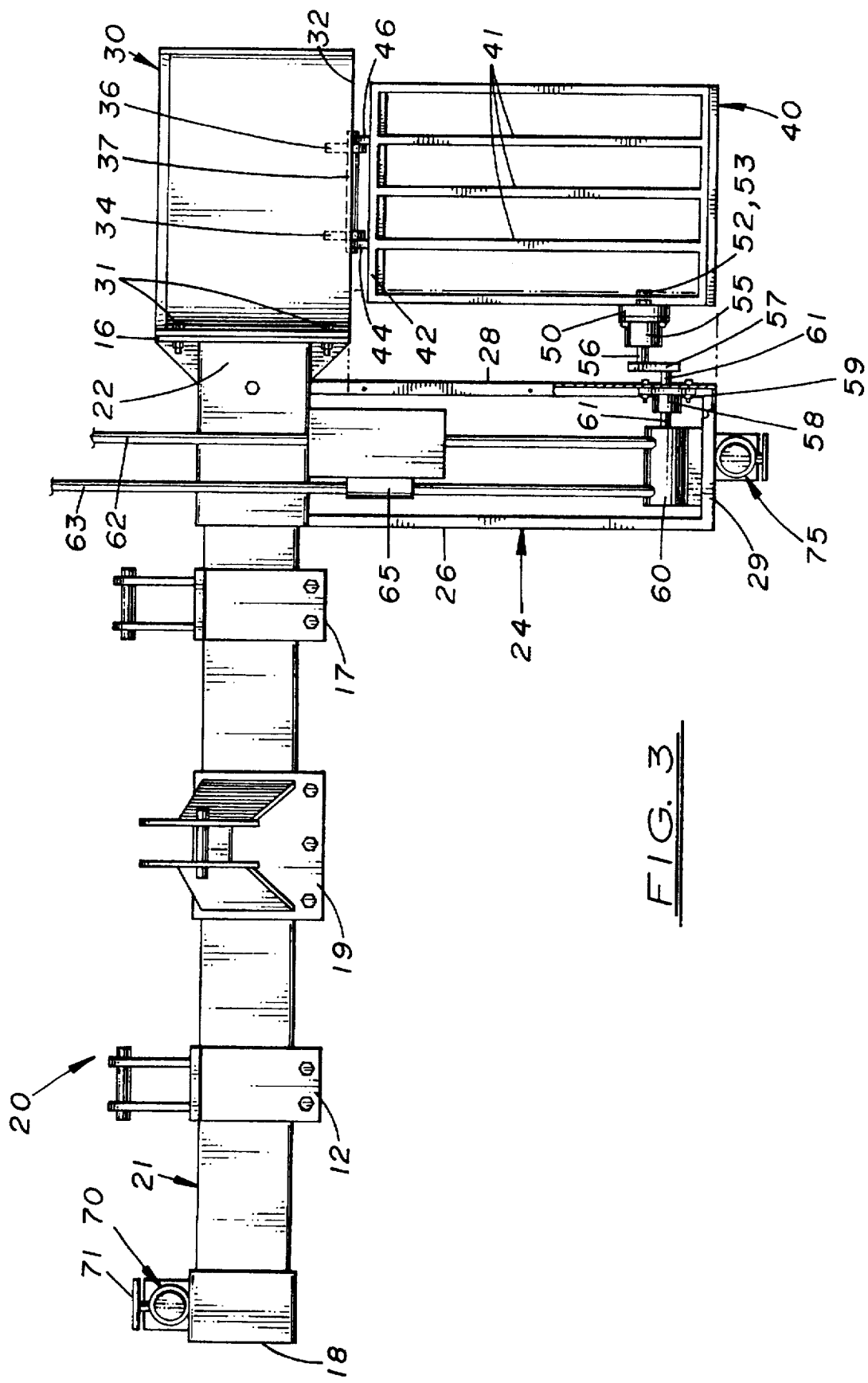
FIG. 3 is a rear elevational view of the front housing plate.
Figure 4:
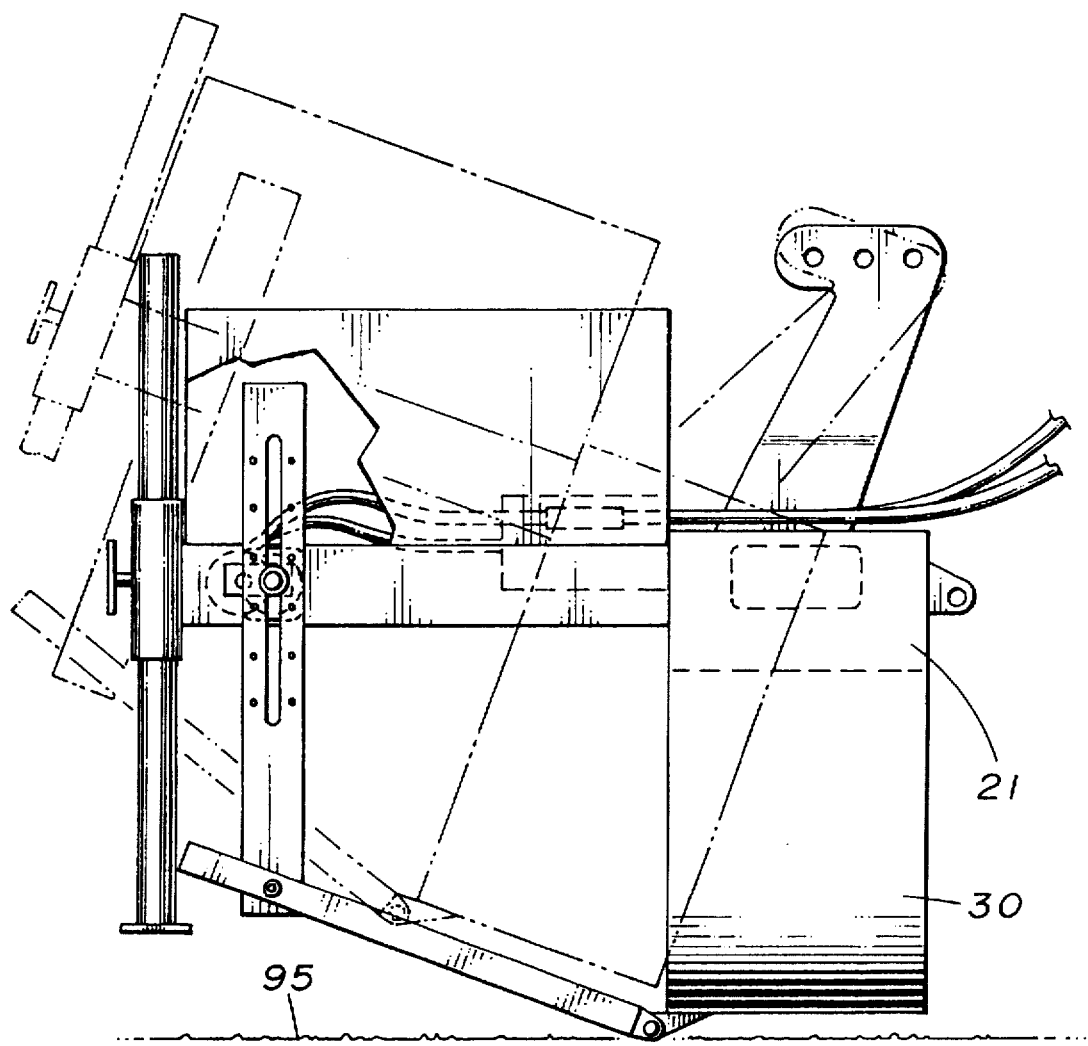
FIG. 4 is a partial, side elevational view of the invention illustrating the pivoting movement of the tool bar and scoops.

As shown in FIGS. 1 and 3, the digger apparatus 20 includes a horizontally aligned tool bar 21 attached to the tractor's three point hitch system 9. The length of the tool bar 21 must be sufficient to connect to the three point hitch system 9 and position the scoop 30, attached to the distal end 22 thereof, transversely over the row of plants to be harvested which are located parallel and adjacent to the tractor. In the embodiment shown, the tool bar 21 is made of 4×8 inch steel rectangular tube material 72 to 96 inches in length. The tractor's lower links 13, 14 are attached to two, spaced apart clamps 12, 17, respectively, attached to the tool bar 21. The clamps 12, 17 may be selectively adjusted along the tool bar 21 so that the digger apparatus 20 may be used with a variety of three point hitch systems on different tractors. Located on the tool bar 21 between the clamps 12, 17 is an upward extending central clamp 19 which attaches to the three point hitches' upper link 11. During use, the tractor's hydraulic system is used to lower and raise the position of the tool bar 21 with respect to the tractor or soil as shown in FIG. 4.

Attached near the distal extending end 22 of the tool bar 21 is a motor mount 24. The motor mount 24 extends rearward and perpendicular from the rear surface of the tool bar 21. In the embodiment shown, the motor mount 24 includes two side members 26, 28 and a rear member 29 welded together at their adjoining ends to form a partially enclosed structure that extends from the rear surface of the tool bar 21. An optional cover 25 (shown in FIG. 1) may be attached to the motor mount 24 to protect the hydraulic motor 60 contained therein and to prevent injuries.

Extending downward from the distal extending end 22 of the tool bar 21 is an adjustable, U-shaped scoop 30 which is dragged on the ground as the tractor 8 is driven in a forward direction on the field. In the embodiment shown, the scoop 30 is made of steel plate material and measures approximately 30 inches in length, 24 inches wide, and 16 inches deep. The inside leg of the scoop 30 is connected via bolts 31 to a flat plate 16 welded to the laterally extending end 22 of the tool bar 21. By fixing the scoop 30 to the end of the tool bar 21 in this manner, the tractor's hydraulic system may be used to adjust the height and angle of the scoop 30 relative to the soil.

Figure 5:
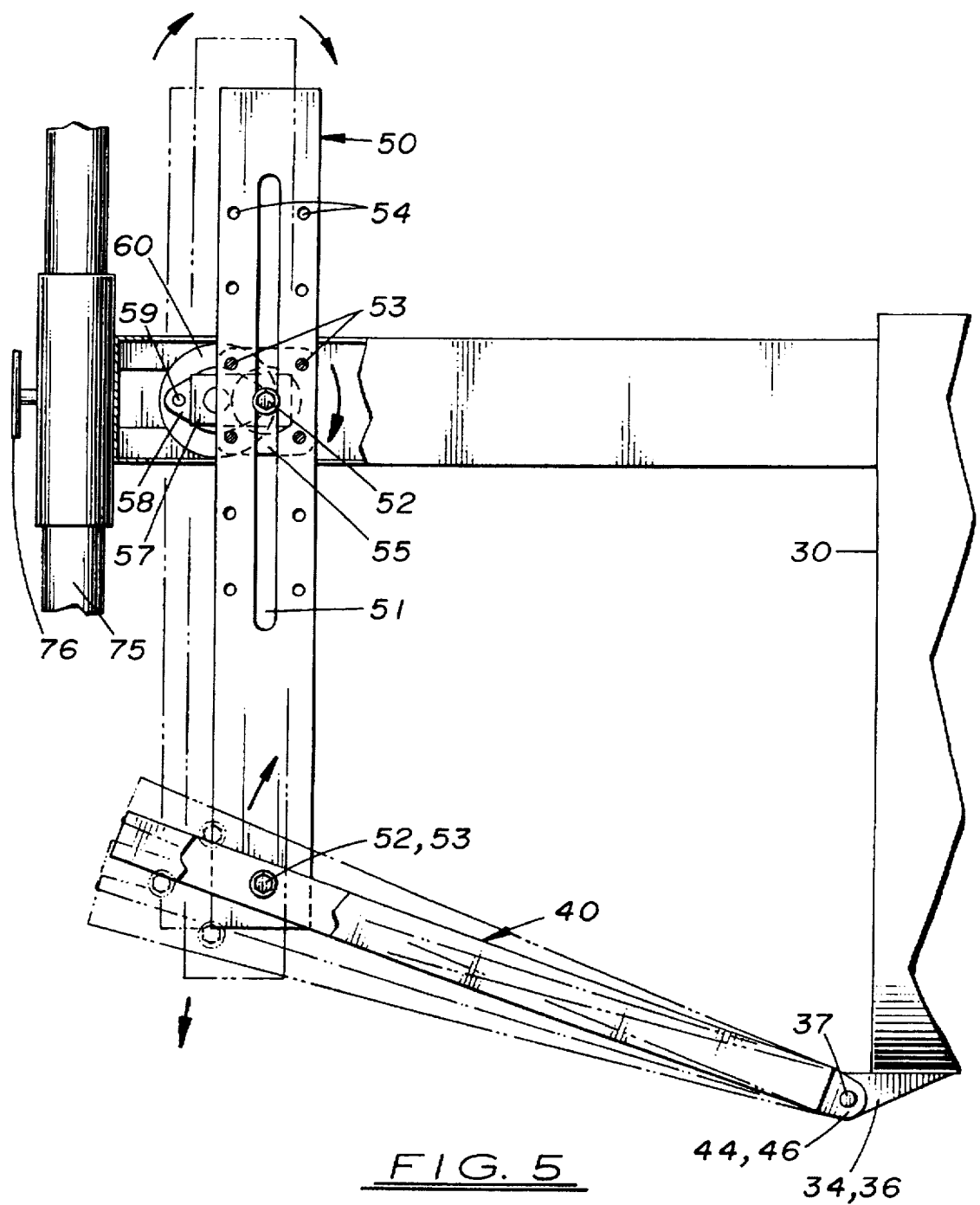
FIG. 5 is a partial, side elevational view of the invention illustrating the movement of the adjustable arm and distal end of the grate.

Located behind the scoop 30 is an adjustable shaking grate 40. The shaking grate 40 is pivotally attached along its leading edge 42 to the rear edge 32 of the scoop 30 as shown in FIGS. 3 and 5. Formed on the leading edge 42 of the shaking grate 40 are two, spaced apart forward extending arms 44, 46 which engage the two complimentary arms rearward extending 34, 36 located on the bottom surface of the scoop 30. A bolt 37 is used to connect the adjoining pair of arms 34, 44 and 36, 46 respectively together, thereby pivotally connecting the scoop 30 and shaking grate 40. The shaking grate 40 itself is made of steel and measures approximately 28 inches in length and 20 inches in width. Three vanes 41 aligned longitudinally inside the shaking grate 40 are approximately 3 inches apart.

Pivotally attached at one end to the inside wall of the shaking grate 40 via a bolt and lock nut 52, 53, respectively, is a rocker arm 50. The rocker arm 50, as shown in FIG. 5, extends upward from the shaking grate 40 and connects to an outer bearing 55 via four bolts 56. Projecting inward from the outer bearing 55 is an outer drive shaft 56 which attaches to the outer surface of an offset arm. The outer bearing 55 is connected to main drive shaft 61 on the hydraulic motor 60 located inside the motor mount 24. The central axis of the outer drive shaft 56 is offset from the central axis on the main drive shaft 61 thereby creating an eccentric which, in turn, causes the rocking action depicted in FIG. 5. In the embodiment shown, the rocker arm 50 has a longitudinally aligned cutout 51 and two parallel rows of holes 54 formed on the opposite sides of the cutout 51 which enables the length of the rocker arm 50 to be adjusted on the outer bearing 55. By adjusting the length of the rocker arm 50, the angle of the shaking grate 40 may be adjusted. By adjusting the angle of the shaking grate 40, the lifting force exerted by the shaking grate 40 may be adjusted to dislodge the soil from the plant's roots according to soil conditions, type and age of plant, and the soil depth of the rear edge 32 of the scoop 30.

The hydraulic motor 60 has an inlet and outlet hydraulic lines 61, 62, respectively, which connect to the tractor's hydraulic system. A check valve 65, is provided on one of the lines 62, 63 so that the hydraulic fluid contained therein flows in only one direction. A switch located on the tractor near the operator may be used to control the hydraulic motor 60 during use. In the preferred embodiment, the hydraulic motor 60 rotates in a clockwise direction and has 16.9 cubic inches of displacement per revolution The size of hydraulic motor 60 may vary depending on the size and amount of hydraulic pressure on the tractor's hydraulic system During use, the hydraulic motor 60 is activated which causes the drive shaft 62 to rotate. As the drive shaft 62 rotates, the outer offset arm 57 rotates and causes the rocker arm 50 to move upward and downward. The upward and downward movement of the rocker arm 50 causes the end of the grate 40 to move in an upward and downward motion.

Optional, adjustable legs 70, 75 are attached near the proximal end 18 of the tool bar 21 and to one of the rear members 29 of the motor mount 24, respectively. The legs 70, 75 and round surface of the scoop 30 are used to support the digger apparatus 20 in a horizontal position on the ground when not in use. This enables the operator to easily connect and disconnect the digger apparatus 20 from the tractor by himself or herself with no additional workers. The legs 70, 75 are lowered or raised via a turn nut 71, 76, respectively.

Figure 2:
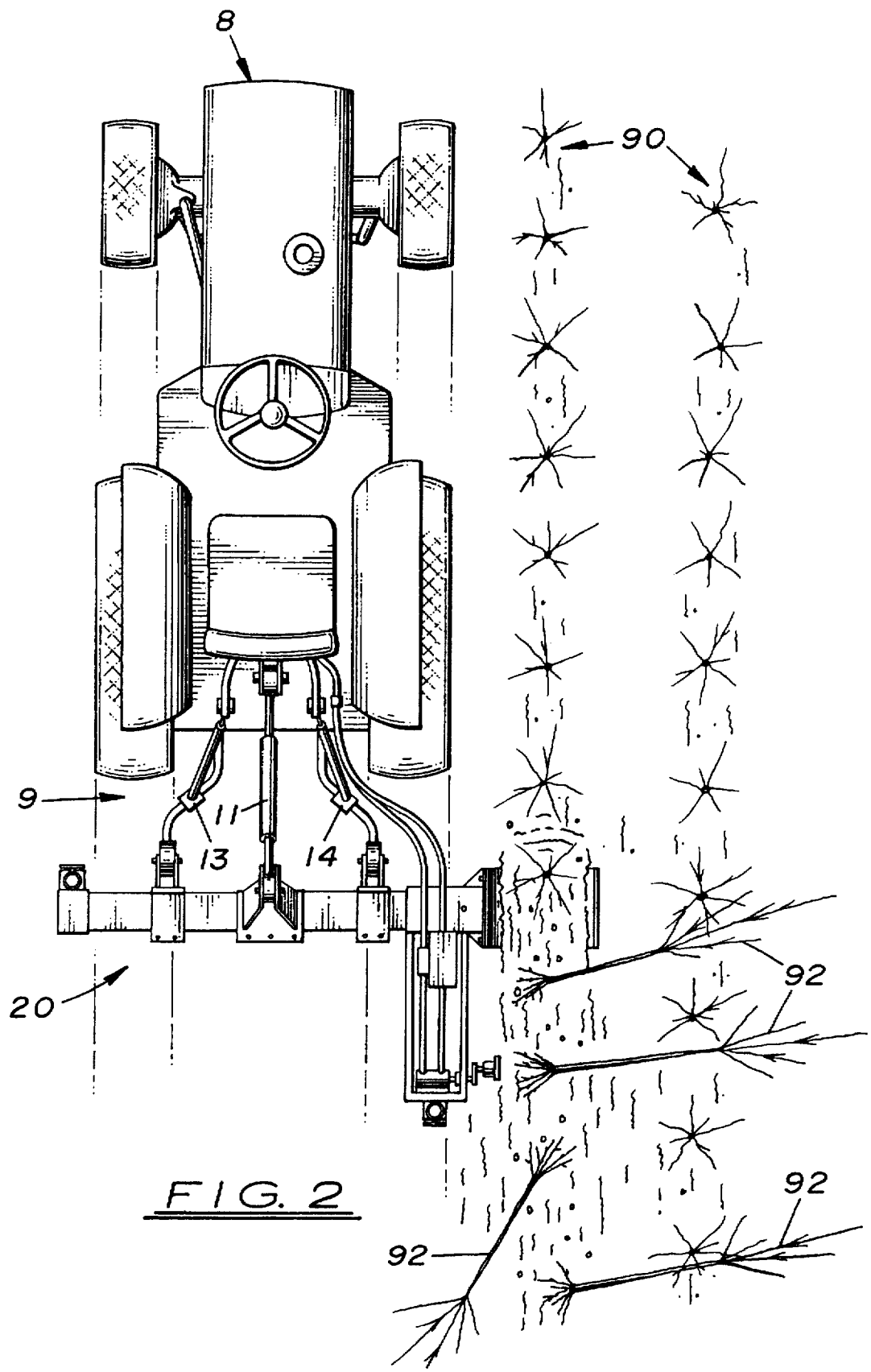
FIG. 2 is a top plan view showing the invention attached to a tractor and used in a field.

After the digger apparatus 20 is attached to a tractor 8, the tractor 8 is then driven onto the field and in position adjacent to a row of plants to be harvested as shown in FIG. 2. The hydraulic system on the tractor 8 is then used to adjust the relative position of the tool bar 21 so that the leading edge of the scoop 30 initially cuts into the ground a depth slightly below the plant's deepest root. The angle of the tool bar 21 is also adjusted so that the scoop 30 remains at this depth in the soil as the tractor 8 moves in a forward direction during use. The length of the rocker arm 50 is also adjusted to adjust the angle of the shaking grate 40 so that the soil is dislodged from the plant's roots.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A vehicle pulled nursery plant digger, comprising;
   a. tool bar capable of being transversely attached to the rear of a vehicle, said tool bar having a distal extending end;
   b. a scoop attached to said distal extending end on said tool bar; said scoop having a leading edge and a rear edge;
   c. a shaking grate disposed behind and pivotally attached along one edge to said rear edge of said scoop;
   d. height adjustment means attached to said tool bar for adjusting the angle of said tool bar and said scoop relative to the soil upon which the vehicle is driven;
   e. a shaking means attached to said shaking grate for shaking said shaking grate in an upward and downward manner to dislodge soil from the roots of a plant deposited on to said shaking grate, said shaking means including a motor with a drive shaft, an eccentric attached to said drive shaft, and a rocker arm pivotally attached at one end to said eccentric and pivotally attached at an opposite end to said shaking grate, wherein when said motor is activated, said eccentric causes said rocker arm to move in an upward and downward motion thereby causing said shaking grate to shake and dislodge soil from the roots of a plant deposited on said shaking grate; and, f. an angle adjustment means for adjusting the angle of said shaking grate relative to said scoop, said angle adjustment means including means which enable said rocker arm to be adjusted in length.

2. A nursey plant digger, as recited in claim 1, wherein said height adjusted means is a hydraulic system located on the vehicle capable of being selectively controlled to raise or lower said tool bar relative to said vehicle.

3. A nursery digger, as recited in claim 1, further including a pair of legs attached thereto capable of supporting said tool bar in an elevational, horizontal position on the ground when disconnected from the vehicle.

4. a nursery plant digger, as recited in claim 3, wherein said motor is hydraulically driven.

5. A nursery plant digger, as recited in claim 4, wherein said scoop is U-shaped.

* * * * *